July 6, 1943.                    D. F. DIENNA, JR                    2,323,586

FOLDOVER CHECK FORM

Filed April 20, 1942

Inventor
Daniel F. Dienna Jr.

Attorneys

Patented July 6, 1943

2,323,586

UNITED STATES PATENT OFFICE 2,323,586

FOLD-OVER CHECK FORM

Daniel F. Dienna, Jr., Allentown, Pa., assignor to Remington Rand Inc., Buffalo, N. Y., a corporation of Delaware Application April 20, 1942, Serial No. 439,687

1 Claim. (Cl. 282—3)

This invention relates to a combination pay check and statement particularly designed for use in preparing employees' pay checks in compliance with our various State and Federal laws.

The invention is designed to reduce or eliminate the duplication of writing in the preparation of pay checks and statements and correspondingly reducing the cost of preparation of the pay checks and the keeping of records incident to the payroll of an employer.

The invention provides for the preparation of checks for the payment of employees' wages, salaries and the like with a reduction in the amount of labor and the number of operations required in the production of the pay checks and records incident to the keeping of the payroll, by providing a pay check wherein a strip of paper is provided with an intermediate section having check and statement sections attached to opposite ends thereof for folding of said sections into superimposed relation with portions of the check and statement sections extending beyond the ends of the intermediate section in offset relation. By inserting a carbon strip under the intermediate section and over the statement section, indicia typed or written on the check section will be duplicated on the registering portions of the statement section in a single writing thereof on the check section, thereby eliminating the necessity for performing two sets of operations to duplicate the same information on the check and statement sections, while at the same time providing for the writing of original segregated and independent information on each of the sections in one continuous and complete operation in the preparation of the combined check and statement.

The invention also provides for the preparation of a plurality of combination pay checks and statements in attached sheet form, wherein the sheet is provided with a plurality of spaced parallel rows of perforations extending in parallel relation to the top and bottom edges of the sheet from side to side thereof to divide the sheet into a plurality of strip sections, each of which is divided throughout the sheet into statement, intermediate and check sections by a pair of spaced parallel rows of perforations extending from the top to the bottom edges of the sheet throughout an intermediate portion thereof between the side edges in order to provide and indicate the fold lines for the folding of the sheet with the several sections so that the intermediate section and adjacent portions of the check and statement sections may be superimposed upon one another for the insertion of a carbon strip between the intermediate and statement sections.

In the drawing:

Figure 1 shows a plan view of a fragmentary portion of a folded sheet formed to provide a plurality of combined pay checks and statements.

Figure 2 is a cross section taken on line 2—2 of Fig. 1.

Figure 3 shows a fragmentary portion of the sheet shown in Fig. 1 in unfolded relation illustrating the details of construction of the sheet and the combination pay check and statement formed in each strip portion across the sheet.

The combination pay check and statement produced according to the present invention is preferably made in sheet form, each sheet containing a plurality of combination checks and statements. For this purpose a sheet 1 of suitable size and of a suitable kind of paper is formed to provide a plurality of uniformly spaced parallel rows of perforations 2 extending transversely of the sheet from side to side thereof in parallel relation to the top and bottom edges of the sheet. These rows of perforations 2 form a plurality of strips 3 extending transversely of the sheet.

A pair of spaced parallel rows of perforations 4 are formed in sheet 1 throughout a central portion of the sheet between the side edges in parallel relation to the side edges and extending from the top to the bottom thereof. The perforations 4 divide each of the strips 3 into three sections. These sections of each strip provide a statement section 5, an intermediate section 6 and a check section 7.

Federal and State legislation requires an employer to make certain deductions from an employee's wages or salary at the time of payment and also requires that the employee be provided with a statement showing the amount and purpose of such deductions. This materially increases the labor required in keeping payroll accounts. Certain information is required to be shown on an employee's check stub that is not to be shown on the employee's check. The combination pay check and statement of the present invention is, therefore, designed to comply with these requirements of the law and at the same time to provide a convenient form of pay check and statement in which the pay check is in the form of a negotiable bank check or draft.

Therefore, in accordance with the invention the check and statement sections are provided with ruled lines 8 and 9 on each section that extend transversely of the sheet and across the respective sections in aligned relation. The right hand portion of the statement section 5 has the area between the ruled lines 8 and 9 divided into a plurality of portions 10, 11 and 12 appropriately designated by printed indicia for identifying the information to be recorded in each portion reading "Date of payment," "Payroll No." and "Employee," respectively. It will, therefore, be understood that the date of the payment to the employee is entered in portion 10, the employee's payroll number is entered in portion 11 and the employee's name in portion 12.

The length of the spaces occupied by the portions 10, 11 and 12 of statement section 5 is equal to the width of intermediate section 6 and a corresponding space at the left hand end of check section 7 is divided into three portions 13, 14 and 15 having similar designations, for receiving the same information as is entered in the respective portions 10, 11 and 12, respectively. These portions are arranged so that portion 13 registers with portion 10, portion 14 with portion 11 and portion 15 with portion 12 when the sheet is folded along the rows of perforations 4 so as to bring intermediate section 6 into overlapping relation above statement sections 5 with check sections 7 overlapping sections 6 as well as sections 5 being in superimposed relation.

By inserting a sheet of carbon paper 16 between intermediate section 6 and statement section 5 with the carbon face toward the upper surface of section 5, the typing or writing of the date, payroll number and employee's name in sections 13, 14 and 15 respectively, will produce a duplicate of said information in sections 10, 11 and 12 respectively. This obtains the simultaneous typing or writing of this information on both the statement section and check section in one writing operation thereby eliminating the work that would otherwise be required to write the information in these two portions of the check and statement by individual writing operations. The intermediate section 6 between the check and statement sections providing for the folding of the several sections into the superimposed relation shown in Figs. 1 and 2 provides a sheet construction that readily facilitates this saving in labor and cost of writing pay checks at the same time employing only a minimum amount of paper to obtain a much greater saving in the labor in the system of keeping payroll accounts and writing payroll checks and statements.

Statement section 5 includes an original typed or written record containing the additional information required on the statement by Federal and State laws. The various deductions required by these laws are listed in specially designated portions under the heading "Deductions" indicated at 17 while other portions of the space between ruled lines 8 and 9 on section 5 are utilized for additional entries of information on the statements.

Check section 7 is provided with appropriately designated sections between ruled lines 8 and 9 beyond the portion superimposed over intermediate section 6 for receiving the entry of the amount of the check, these portions being indicated by the numeral 18 and clearly shown in the drawing.

Combined checks and statements in sheet form as illustrated in the drawing and described above are adapted to be written in coordinated relation with payroll ledger sheets and other record forms used in keeping payroll accounts through having the other record forms (not shown), associated with sheet 1 in the folded relation shown in Fig. 1 and in the rear thereof with suitable carbon paper between the several sheets so that the entires of all information on each check and statement section are simultaneously recorded on payroll ledger and other accounting forms for use in the accounting system of the employer without additional labor in making the entries. In operating an accounting system of this character it is usual to use these sheets with any one of the several different types of bookkeeping machines that are now well-known and widely used for the writing of checks and statements, as well as other accounting records.

When the employee receives his combined check and statement constructed in accordance with the present invention, the check can be readily detached along the line of perforations 4 from intermediate section 6. Intermediate section 6 can be detached from statement section 5 by separating the two sections along the line of perforations 4 at their connected edges. The invention provides a substantial saving in the preparation of employees' pay checks, particularly with employers having a large number of employees.

The invention claimed is:

A foldover check form comprising a sheet formed to provide a check section, an intermediate section, and a statement section, means foldably and detachably connecting said check and statement sections to opposite ends of said intermediate section for folding of said sections into superimposed relation over opposite sides of said intermediate section in oppositely extending relation thereover to form a Z-shaped sheet structure in folded relation, said check and statement sections having free end portions extending beyond the superimposed portions of said sheet in opposite directions and at opposite sides thereof, and a row of appropriately designated sections extending in aligned relation across both the check and statement sections so that the free ends of said sections have appropriately designated sections thereon for information not to be duplicated and the overlapping portions thereon have appropriately designated sections thereon held in registry by said intermediate section for duplicating on each section simultaneously in one writing by interposing a transfer medium between the statement and intermediate section whereby one original writing will provide an original record of the information required to be written in original form on both the check and statement sections and duplicated information on said statement section of identifying information on said check section for accurately identifying the check section and statement section after detachment.

DANIEL F. DIENNA, JR.